US010659621B2

(12) United States Patent
Muraishi

(10) Patent No.: US 10,659,621 B2
(45) Date of Patent: May 19, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Masaaki Muraishi, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 15/891,108

(22) Filed: Feb. 7, 2018

(65) Prior Publication Data

US 2018/0167518 A1 Jun. 14, 2018

Related U.S. Application Data

(63) Continuation of application No. 15/201,131, filed on Jul. 1, 2016, now Pat. No. 9,924,046.

(30) Foreign Application Priority Data

Jul. 6, 2015 (JP) .................................. 2015-135677

(51) Int. Cl.
*H04N 1/00* (2006.01)
(52) U.S. Cl.
CPC ..... *H04N 1/00005* (2013.01); *H04N 1/00037* (2013.01); *H04N 1/00724* (2013.01); *H04N 1/00803* (2013.01); *H04N 2201/0094* (2013.01)
(58) Field of Classification Search
CPC ........... H04N 1/00005; H04N 1/00724; H04N 1/00037; H04N 1/00803; H04N 2201/0094
USPC ....................................... 358/1.15
See application file for complete search history.

(56) References Cited

U.S. PATENT DOCUMENTS

| 2008/0266612 | A1* | 10/2008 | Nishioka | .................. | H04N 1/38 358/464 |
| 2015/0022865 | A1* | 1/2015 | Nakamura | ......... | H04N 1/40093 358/3.27 |
| 2015/0062658 | A1* | 3/2015 | Mori | .................. | H04N 1/00803 358/3.01 |
| 2017/0019569 | A1* | 1/2017 | Arakawa | .................. | H04N 1/62 |
| 2018/0167518 | A1* | 6/2018 | Muraishi | ............ | H04N 1/00005 |

FOREIGN PATENT DOCUMENTS

| JP | 2008306396 | A | 12/2008 | |
| JP | 2009044284 | A | 2/2009 | |
| JP | 2017017659 | A | 1/2017 | |
| JP | 2018129861 | | * 8/2018 | ............... H04N 1/00 |

OTHER PUBLICATIONS

"The Difference Between Chroma and Saturation" & "What do Hue, Chroma, Saturation, Value, Tones, Tints, Shade, etc. means?" May 2018.*

* cited by examiner

*Primary Examiner* — Jerome Grant, II
(74) *Attorney, Agent, or Firm* — Canon U.S.A., Inc. IP Division

(57) ABSTRACT

An image processing apparatus includes a blank page determination unit configured to determine whether a document is a blank page by using image data obtained by reading the document, a color determination unit configured to determine whether the document is polychrome or monochrome, and a decision unit configured to decide on processing of the image data obtained by reading the document by using a determination result of the blank page determination unit and a determination result of the color determination unit.

9 Claims, 16 Drawing Sheets

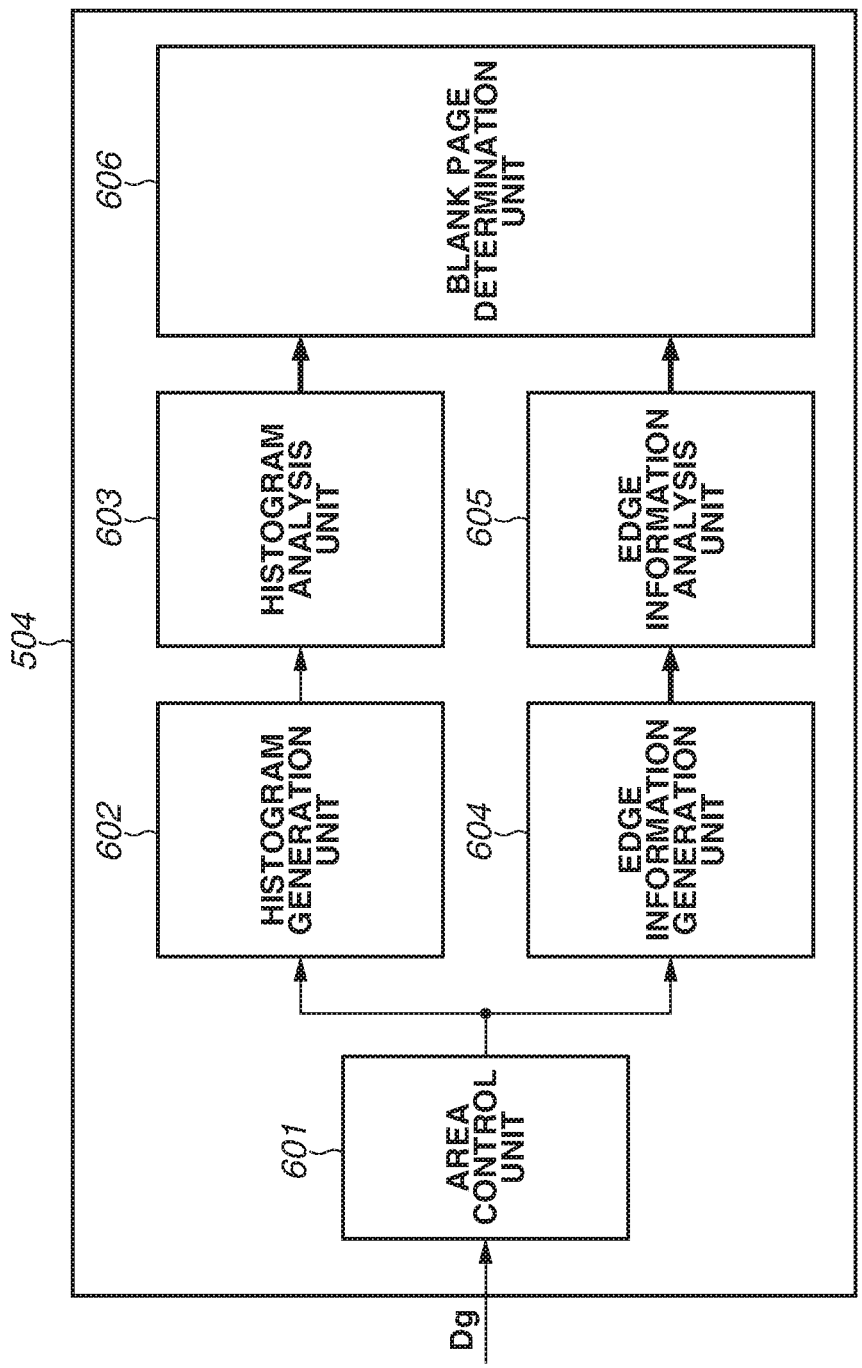

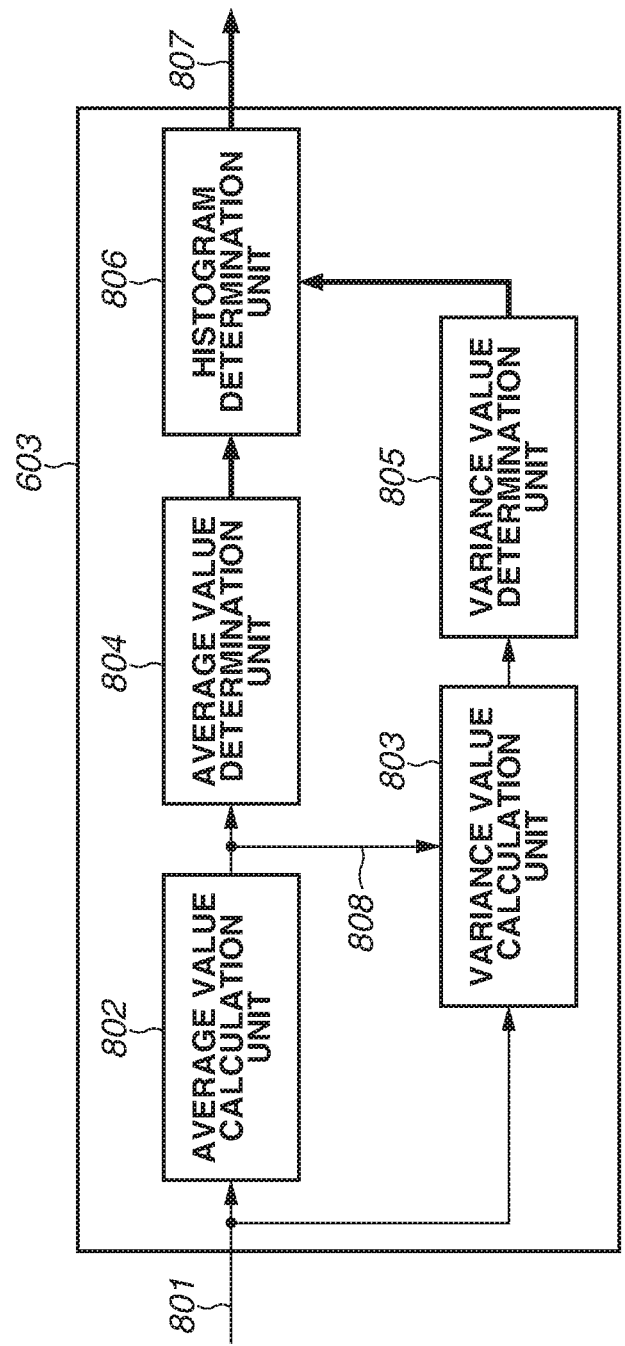

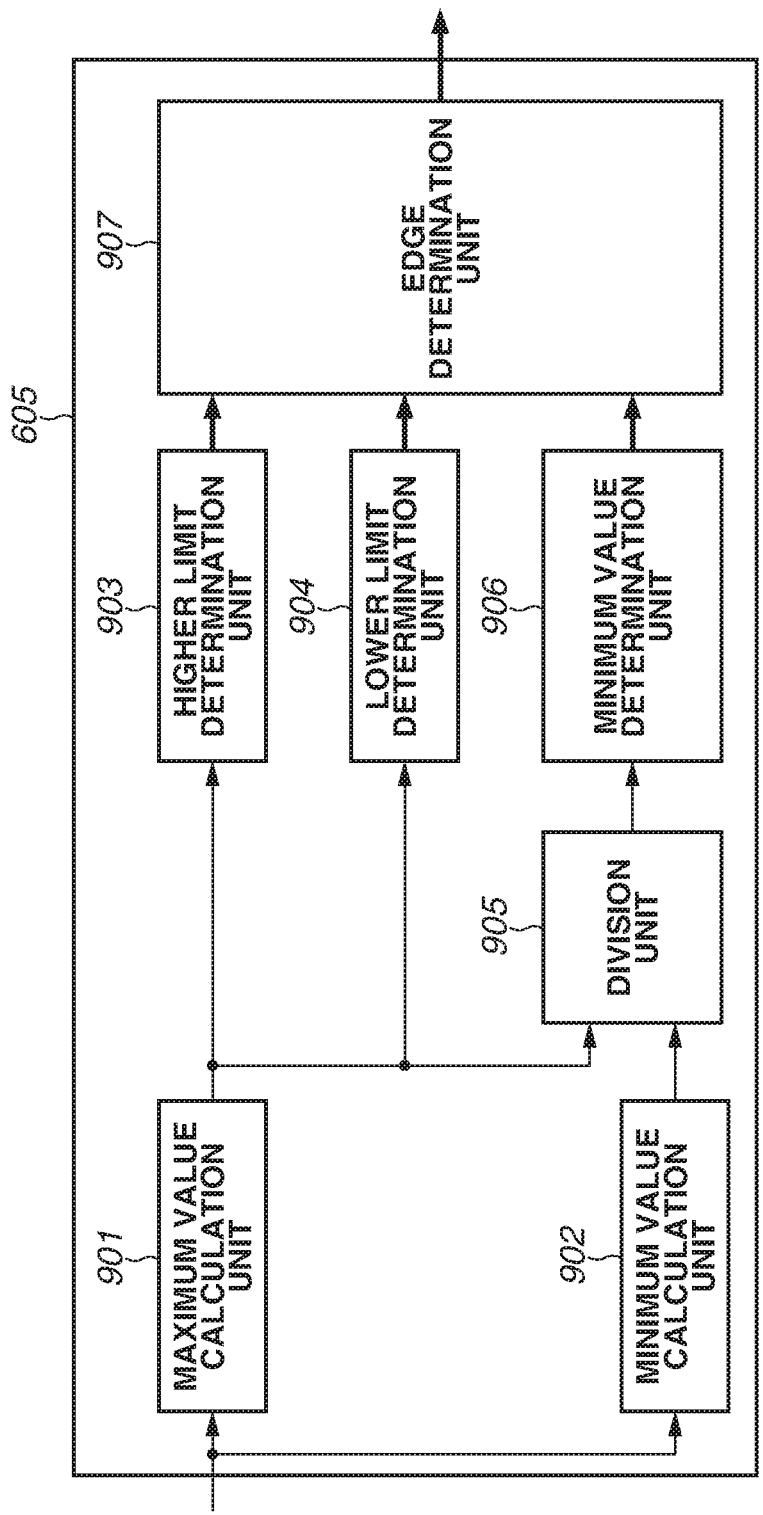

IMAGE PROCESSING APPARATUS, IMAGE PROCESSING METHOD, AND STORAGE MEDIUM

CROSS-REFERENCE TO RELATED APPLICATION

This application is a Continuation of U.S. application Ser. No. 15/201,131, filed Jul. 1, 2016, which claims priority from Japanese Patent Application No. 2015-135677, filed Jul. 6, 2015, which are hereby incorporated by reference herein in their entireties.

BACKGROUND OF THE INVENTION

Field of the Invention

The present invention relates to an image processing apparatus that determines whether image data is data obtained by reading a page containing printing information or data obtained by reading a blank page having no printing information.

Description of the Related Art

For image reading apparatuses such as a digital copying machine, mainly two types of document reading techniques are available. One technique is reading an image by placing a document on a platen glass and moving an optical system while fixing the position of the document (an optical-system moving method). The other technique is reading an image by conveying a document with an auto document feeder (ADF) while fixing the position of an optical system (a feeding-reading method).

A conventional multi-function peripheral apparatus equipped with an automatic document scanner reads both sides of a sheet even when double-sided printed documents and single-sided printed documents are mounted in a mixed manner.

However, in this method, a blank page on the back of the single-sided printed document is also read. Therefore, unnecessary data is processed, which reduces a processing speed. In addition, print processing is executed also on image data generated by reading the blank page when the read document is output, which causes unnecessary paper consumption and power consumption. Therefore, unnecessary printing, paper, and toner consumption can be suppressed by using blank page detection, thereby removing image data determined to be the image data obtained by reading the blank page. Further, in a case where the obtained data is transmitted as electronic data such as an e-mail, file capacity can be suppressed by removing the image data determined to be the image data obtained by reading the blank page. Therefore, various types of blank page detection methods have been devised (see Japanese Patent Application Laid-Open No. 11-55503).

Japanese Patent Application Laid-Open No. 11-55503 discusses a blank page determination method. This method detects an edge portion from image data read from a document, and determines whether the document is a blank page, based on a ratio of an amount of the detected edge portion to the total number of pixels.

Japanese Patent Application Laid-Open No. 2008-219808 discusses a method for detecting a blank page. Specifically, this method determines whether a document is a color background document or white background document, and changes a determination criterion for detecting blank page if image data obtained by reading the document is determined to be image data obtained by reading a color background document. Thus, when the color background document includes a blank page, this blank page is detected.

However, a document to be detected as a blank page may vary according to usage intended by a user.

For example, assume that a piece of colored paper having a background color other than white is inserted as a slip sheet into documents each having a background color of white and containing printing information. In this case, it may be desirable to detect and remove image data obtained by reading a blank page included in the white background documents. However, it may be desirable to output image data obtained by reading blank pages of the colored paper, as the slip sheet. Further, it may be desirable to detect and remove image data obtained by reading the colored paper inserted as the slip sheet, without removing the image data obtained by reading the blank page included in the white background documents to maintain a layout.

In this way, depending on the usage intended by the user, the image data obtained by reading the blank page may not be the data desired to be removed. That is, the image data desired to be removed may vary according to the background color of the blank page (document).

SUMMARY OF THE INVENTION

According to an aspect of the present invention, an image processing apparatus includes a blank page determination unit configured to determine whether a document is a blank page by using image data obtained by reading the document, a color determination unit configured to determine whether the document is polychrome or monochrome, and a decision unit configured to decide processing of the image data obtained by reading the document by using a determination result of the blank page determination unit and a determination result of the color determination unit.

According to the aspect of the present invention, it is possible to detect a blank page as intended by a user.

Therefore, whether to remove image data corresponding to a detected blank page can be switched based on a background color of the page in the document.

Further features of the present invention will become apparent from the following description of exemplary embodiments with reference to the attached drawings.

BRIEF DESCRIPTION OF THE DRAWINGS

FIG. 6 is a block diagram illustrating an example of a configuration of a blank page detection processing unit.

FIG. 8 is a block diagram illustrating an example of a histogram analysis unit.

FIG. 9 is a block diagram illustrating an example of an edge information analysis unit.

DESCRIPTION OF THE EMBODIMENTS

Exemplary embodiments of the present invention will be described in detail below with reference to the drawings. The exemplary embodiments described below are not intended to limit the invention according to the scope of claims. Further, any combination of features described in the exemplary embodiments is not necessarily essential to a solution of the invention.

In the following description, a blank page refers to a document containing no printing information (content). Blank page determination is to determine presence/absence of contents printed on a document. In addition, image data obtained by reading the above documents and image data having only a show-through image obtained in the reading are each also referred to as a blank page. A document with a small amount of text or faint text printed with dots is not a blank page.

Figure 1:
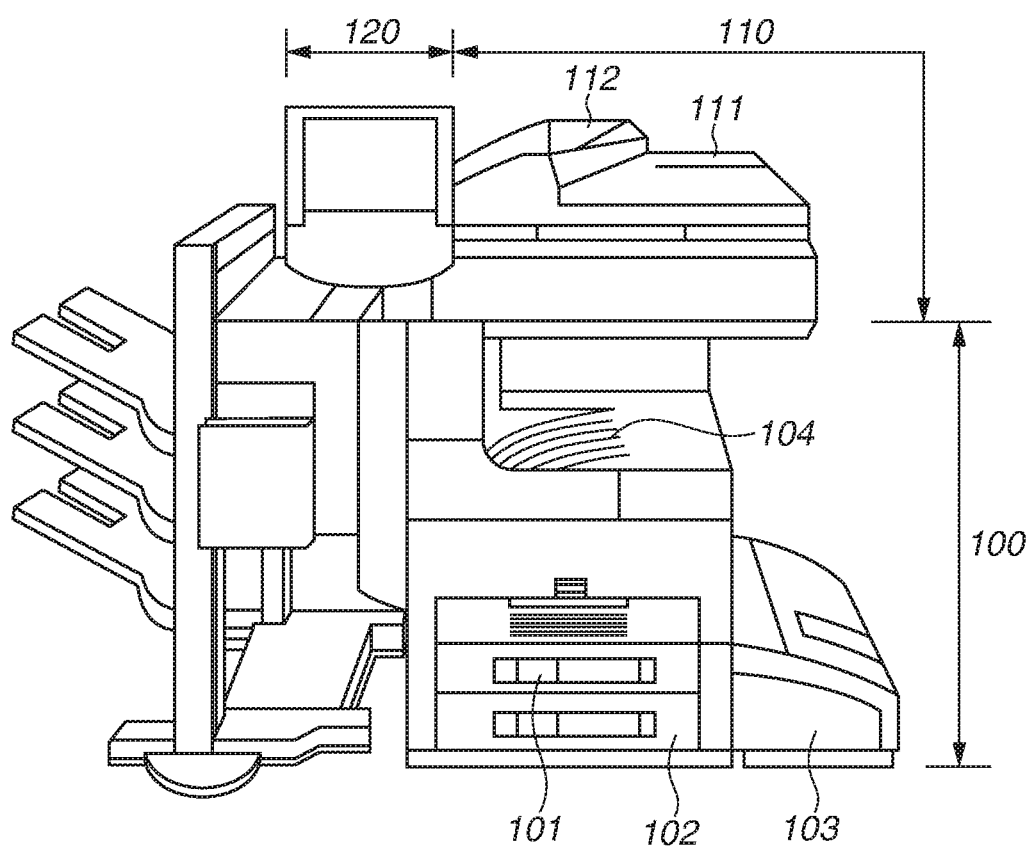
FIG. 1 is a diagram illustrating an example of an external view of a copying machine in a first exemplary embodiment.

FIG. 1 is a diagram illustrating an example of an external view of a copying machine in a first exemplary embodiment.

A scanner unit 110 is an image reader. The scanner unit 110 converts information of an image into an electrical signal by inputting reflected light which is obtained by performing exposure scanning on the image of a document with light emitted from an illumination lamp, into a linear image sensor (a charge coupled device (CCD) sensor). Further, the scanner unit 110 converts the electrical signal into a luminance signal formed of R, G, and B colors, and outputs the luminance signal as image data to a controller 300 (FIG. 3) described below.

Documents are set on a tray 112 of a document feeder 111. When a reading start instruction is issued from a user via an operation unit 120, the controller 200 sends a document reading instruction to the scanner unit 110. Upon receiving this instruction, the scanner unit 110 performs document reading operation by feeding the documents from the tray 112 of the document feeder 111 one by one (this operation mode will be hereinafter referred to as a feeding-reading mode). The document can be read when placed on a platen glass described below.

A printer 100 is an image forming device for forming an image of the image data, which is received from the controller 200, on a sheet.

An image forming method in the present exemplary embodiment is an electrophotographic method using a photosensitive drum and a photosensitive belt. Further, the printer 100 includes paper cassettes 101, 102, and 103 capable of accommodating different paper sizes and different sheet orientations. A sheet after printing is output to a discharge tray 104.

<Scanner Unit of Copying Machine>

Figure 2:
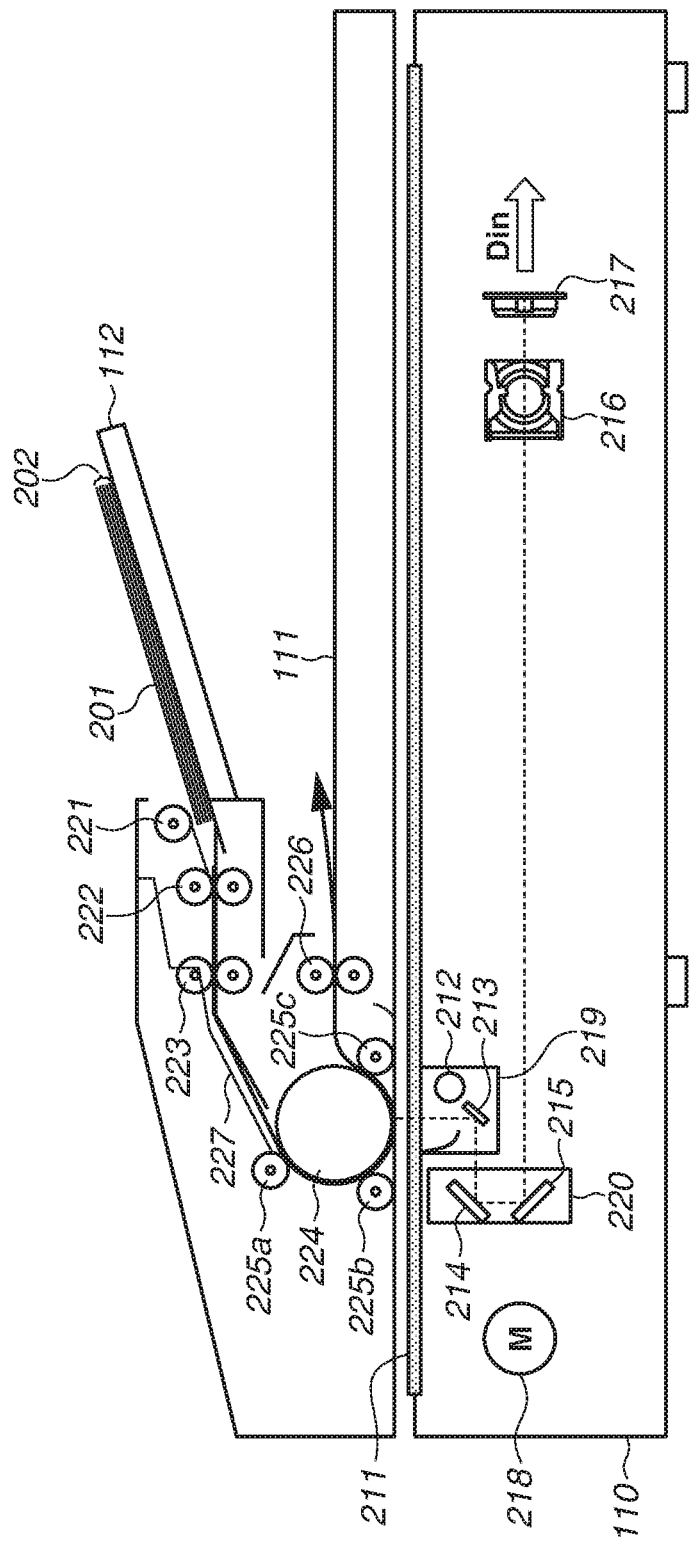
FIG. 2 is a diagram illustrating an example of a structure of a scanner unit in a feeding-reading operation.

FIG. 2 is a schematic diagram illustrating a main configuration and reading operation of the scanner unit 110 using the linear image sensor in the present exemplary embodiment. In particular, FIG. 2 illustrates an overview of a main configuration and reading operation in "feeding-reading" in which a document is read by operating the document feeder 111.

In FIG. 2, a document batch 202 to be read is placed on the tray 141. Further, a delivery roller 221, a separating conveying roller 222, and a registration roller 223 are disposed downstream in a document conveying direction. The delivery roller 221 is driven by a drive source (not illustrated) to rotate, thereby sending out the document batch 202 placed on the tray 141. Next, the separating conveying roller 222, which is disposed downstream from the delivery roller 221, separates and conveys an uppermost document 201 from the document batch 202. Start of rotation of the registration roller 223, which is disposed downstream from the separating conveying roller 222, serves as a reference for image reading timing and conveyance timing of the subsequent document 201.

The drive source for driving each of the delivery roller 221, the separating conveying roller 222, and the registration roller 223 is, for example, a stepping motor.

The document 201 output from the registration roller 223 moves forward along a guide plate 227. The document 201 is then conveyed along an outer periphery of a conveying roller 224 having a large diameter and rotating, while being pinched between the conveying roller 224 and following rollers 225a, 225b, and 225c. In this process, the document 201 passes a surface of a platen glass 211 once and is conveyed at a constant speed in a direction of an arrow in FIG. 2.

When the document 201 passes the surface of the platen glass 211, the image reader described below reads an image of the document 201.

After the image reading, the document 201, which is continuously conveyed along the outer periphery of the conveying roller 224, is output onto a surface of the document feeder 111 by a discharge roller 226.

In this feeding-reading mode, the document only needs to be moved in a given direction. Therefore, a large quantity of documents can be successively read at a high speed.

Next, the image reader in the present exemplary embodiment will be described. In the feeding-reading mode, the document 201 passes the surface of the platen glass 211 as described above. At this moment, a first mirror unit 219 and a second mirror unit 220 are moved by a motor 218, and fixed at a position illustrated in FIG. 2. Therefore, when the document 201 faces the surface of the platen glass 211, the document 201 is irradiated by an illumination lamp 212 provided in the first mirror unit 219. Reflected light resulting from this irradiation forms an image on a CCD sensor 217 via a lens 216, after proceeding through mirrors 213, 214, and 215. The reflected light input into the CCD sensor 217 is converted into an electrical signal by the CCD sensor 217, and the electrical signal corresponding to a pixel is converted into digital data by an analog-to-digital (A/D) converter (not illustrated). The digital data is then input into the controller 200 as a pixel signal Din.

In this method, a rodlike light source is used, and a reading line is set in a direction parallel with a longitudinal direction of the light source. A document is conveyed in a direction perpendicular to this reading line. The direction parallel with the reading line is defined as a main-scanning direction, and the direction perpendicular to the reading line is defined as a sub-scanning direction (a document conveying direction).

In addition to the feeding-reading mode, there is a mode that places a document to be read on the platen glass 211 to perform image reading. In this method, the first mirror unit 219 including the mirror 213 and the illumination lamp 212 moves at a speed of v under the platen glass 211 on which the document is placed. Further, the second mirror unit 220 including the mirrors 214 and 215 moves at a speed of ½v in a direction similar to the direction in which the first mirror unit 219 moves to scan the entire surface of the document. The first mirror unit 219 and the second mirror unit 220 are driven by the motor 218.

<Controller of Copying Machine>

Figure 3:
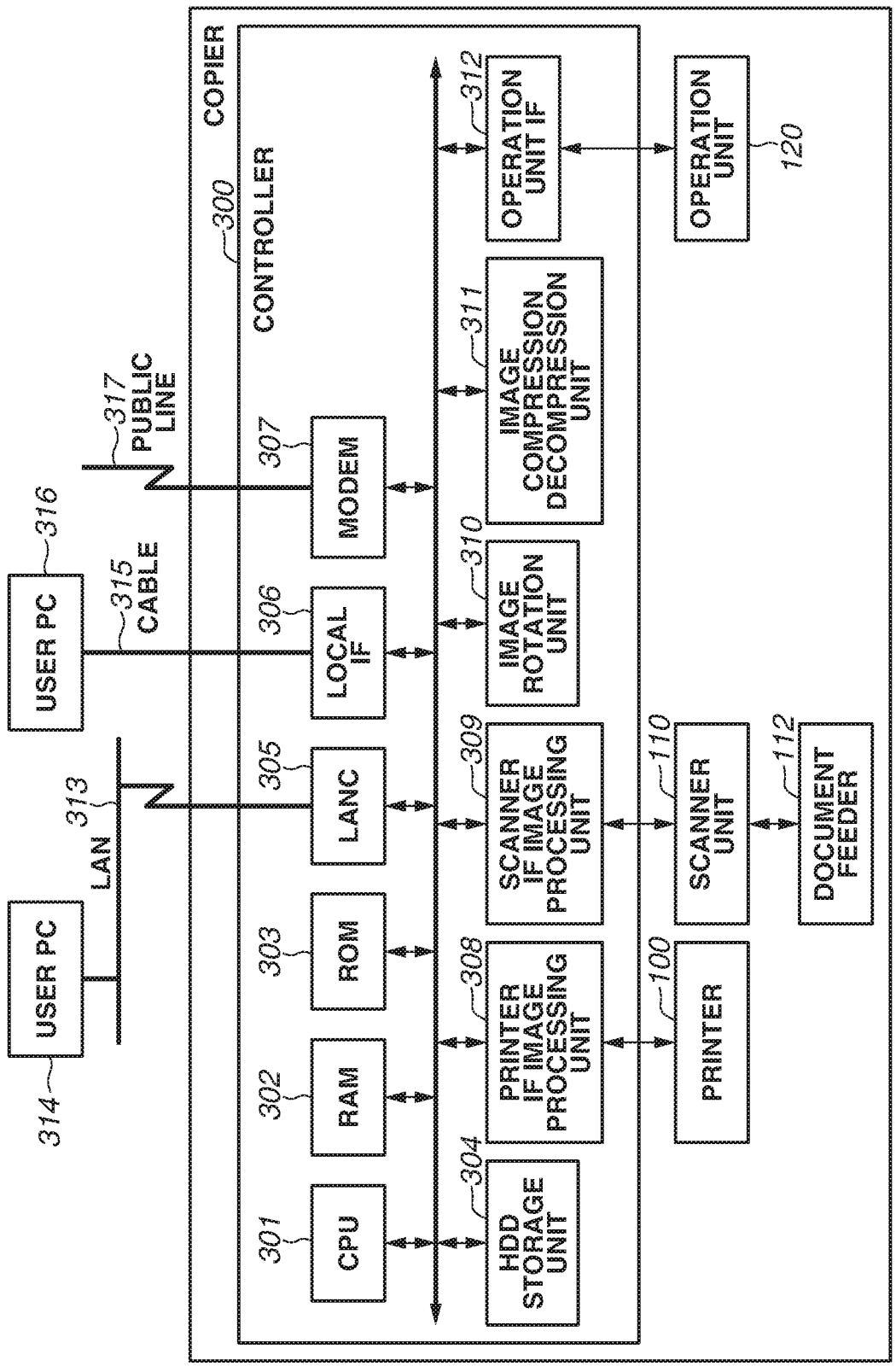
FIG. 3 is a block diagram illustrating an example of a configuration of a controller.

FIG. 3 is a block diagram illustrating an example of a hardware configuration of the copying machine used in the present exemplary embodiment. FIG. 3 illustrates, in particular, details of a configuration example of the controller 200.

The controller 200 is connected to the scanner unit 110 serving as an image input device, the printer 100 serving as an image output device, a local area network (LAN) 313, and a public line (wide area network (WAN)) 317. The controller 200 comprehensively controls operation of the copying machine, and controls input/output of image information and device information.

A central processing unit (CPU) 301 is a processor for controlling the entire copying machine, and comprehensively controls access to/from various devices being connected, based on a control program stored in a read only memory (ROM) 303. Further, the CPU 301 comprehensively controls various kinds of processing performed inside the controller 200.

A random access memory (RAM) 302 is a system work memory for an operation of the CPU 301 and also serves as an image memory for temporarily storing data such as image data.

The ROM 303 is a boot ROM, and stores a boot program of a system.

A hard disc drive (HDD) 304 mainly stores information (system software) necessary for activation and operation of a computer and image data. Such information and data do not need to be stored in the HDD 304, and may be stored in any storage medium as long as they can be held even if the power is off.

A LAN controller (LANC) 305 is connected to the LAN 313. The LANC 305 performs input/output of image data to be output, and input/output of information related to device control, to/from a user's personal computer (PC) 314.

A local interface (local IF) 306 is an interface based on a standard such as Universal Serial Bus (USB). The local IF 306 is connected to a user's PC 316 or printer via a cable 315, and performs input/output of data.

A modulator-demodulator (MODEM) 307 is connected to the public line 317, and performs input/output of data.

A printer IF image processing unit 308 is connected to the printer 100 to communicate with a CPU mounted on the printer 100. Further, the printer IF image processing unit 308 performs synchronous/asynchronous conversion of image data and image processing for print output. Furthermore, the printer IF image processing unit 308 performs color conversion processing based on a determination result of a color determination processing unit 505 described below. Specifically, the printer IF image processing unit 308 performs polychrome-monochrome conversion when the determination result indicates monochrome.

A scanner IF image processing unit 309 is connected to the scanner unit 110 including the document feeder 111, and communicates with a CPU mounted on the scanner unit 110. Further, the scanner IF image processing unit 309 performs image processing for image reading, including synchronous/asynchronous conversion of image data, blank page detection processing described below, and color detection processing.

An image rotation unit 310 performs rotation processing on input image data, based on a document orientation and a processing condition set by the user via the operation unit 120.

An image compression decompression unit 311 performs processing for compressing multivalued image data to a Joint Photographic Experts Group (JPEG) format, and compressing binary image data to a format such as Joint Bi-level Image Experts Group (JBIG), Modified Modified Relative Element Address Designate (Modified Modified READ, or MMR), and Modified Huffman (MH). Further, the image compression decompression unit 311 performs processing for decompressing compressed image data as necessary.

An operation unit IF 312 is an interface for outputting image data to be displayed on the operation unit 120 from the controller 200 to the operation unit 120, and outputting information input by the user of the copying machine from the operation unit 120 to the controller 200.

<Operation Unit of Copying Machine>

Figure 4:
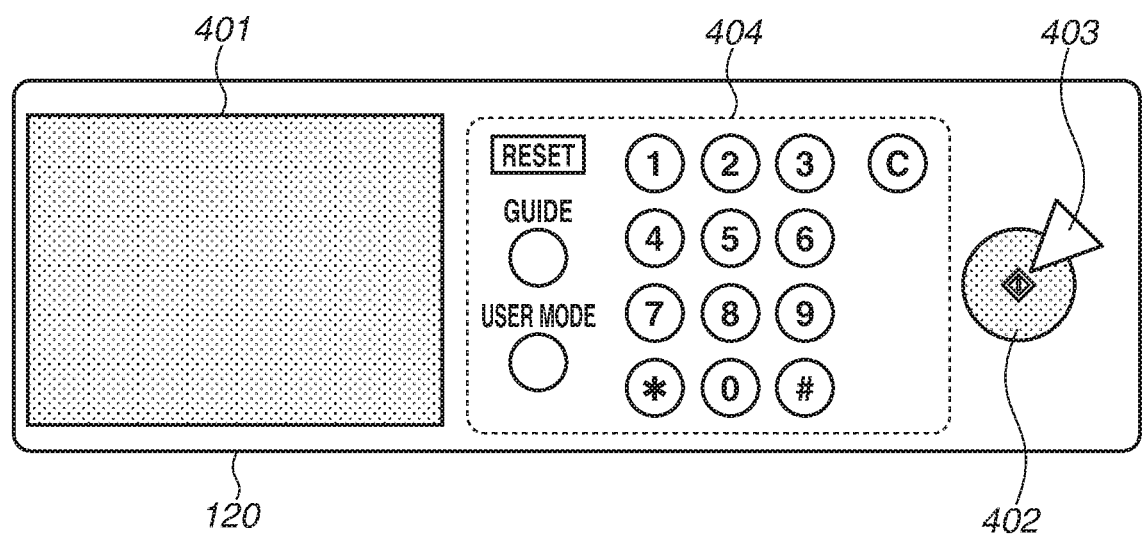
FIG. 4 is a diagram illustrating an example of a configuration of an operation unit.

FIG. 4 is a diagram illustrating an example of a configuration of the operation unit 120.

A liquid crystal control panel 401 is a panel combining a liquid crystal display and a touch panel. The liquid crystal control panel 401 displays an operation screen, and sends information corresponding to a display key to the controller 200 when the display key is pressed by the user. A start key 402 is used to start operation for reading and printing a document image, and to issue an instruction for starting any other function. Light emitting diodes (LEDs) of two colors of red and green are built in the start key 402. The start key 402 indicates that start is enabled when the green light is on, and indicates that start is disabled when the red light is on. A stop key 403 serves to stop an operation under way. A hard key group 404 includes a numeric keypad, a clear (C) key, a reset key, a guide key, and a user mode key.

<Scanner IF Image Processing Unit>

Figure 5:
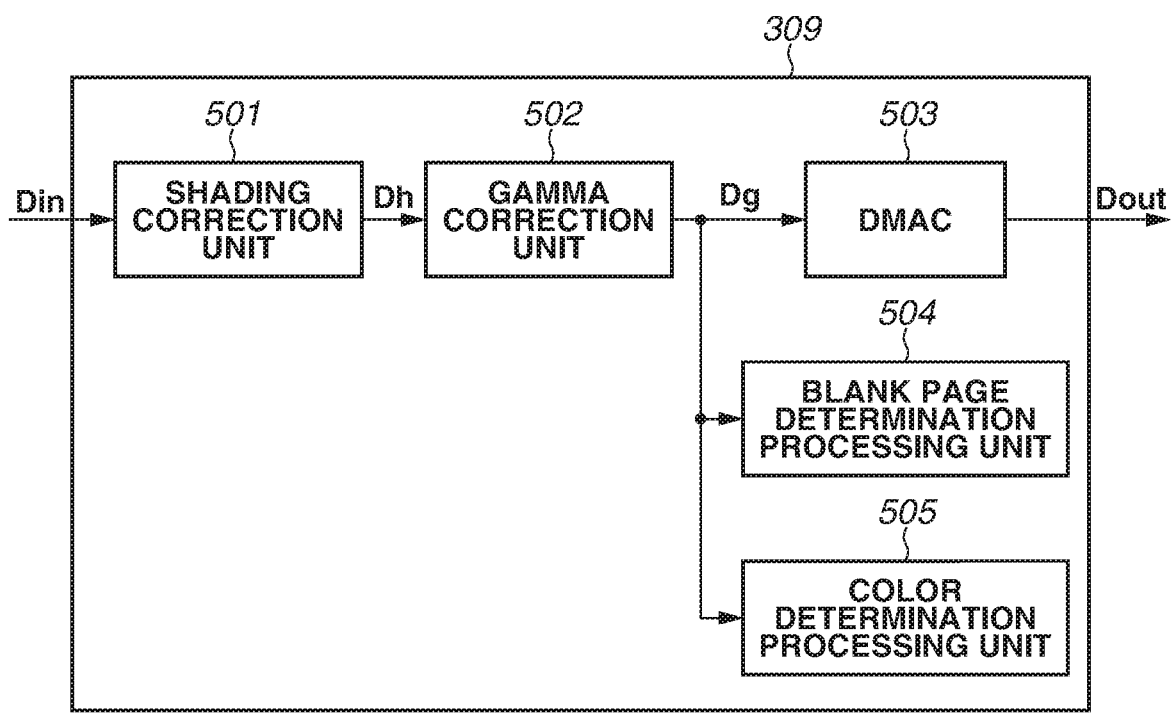
FIG. 5 is a block diagram illustrating an example of a configuration of a scanner interface (IF) image processing unit.

FIG. 5 is a block diagram illustrating an example of a configuration of the scanner IF image processing unit 309.

The scanner IF image processing unit 309 is connected to a register (not illustrated), and provided to operate based on control parameters set in the register. Writing to the register is performed by the CPU 301 and the scanner IF image processing unit 309.

A shading correction unit 501 performs shading correction processing by using a conventional technique. The shading correction processing is performed to address luminance unevenness, which occurs due to characteristics of an optical system or an image pick up system, to obtain an image having uniform brightness. A pixel signal Dh after undergoing the shading correction processing is output to a subsequent stage.

A gamma correction unit 502 corrects a difference in color characteristic between a reading element and a device, by using a conventional technique. A pixel signal Dg after undergoing the gamma correction processing is output to a subsequent stage.

A direct memory access controller (DMAC) 503 is a controller for directly writing the pixel signal Dg output by the gamma correction unit 502, to a specified area of the image memory (the RAM 302) without intervention of the CPU 301. The pixel signal Dg is written by DMAC 503 as data Dout.

A blank page determination processing unit 504 determines whether the read image data is a blank page. This will be described in detail below.

The color determination processing unit 505 determines whether the read image data is polychrome or monochrome. This will be described in detail below.

<Blank Page Determination Processing Unit>

FIG. 6 is a diagram illustrating an inner configuration of the blank page determination processing unit 504 in the present exemplary embodiment. The blank page determination processing unit 504 is connected to a register (not illustrated), which holds control parameters and processing results. Writing to the register is performed by the CPU 301 and the blank page determination processing unit 504. The blank page determination processing unit 504 operates by reading the control parameters set in the register.

The blank page determination processing unit 504 will be described below with reference to FIG. 6.

An area control unit 601 controls an area for generating a histogram and edge information from the input image data. When the document feeder 111 reads a document, the front end, rear end, left end, and right end of the document depend on a document conveyance configuration and a light source configuration of the CCD sensor 217. The area control unit 601 determines whether a pixel position within the document, which corresponds to the currently input pixel is an effective area or an ineffective area. The area control unit 601 then generates a signal indicating the effective area or ineffective area.

Figure 14A:
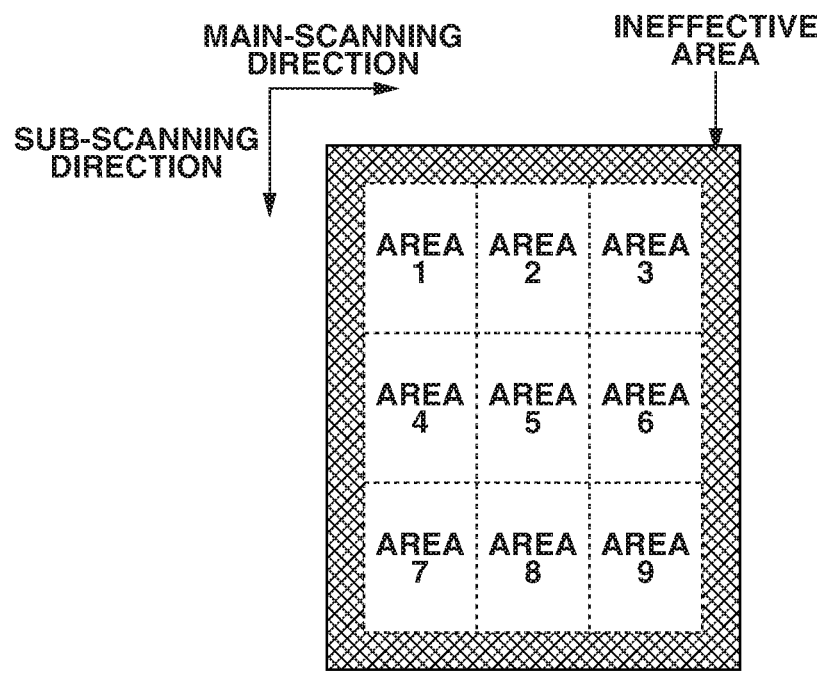
FIGS. 14A and 14B are diagrams each illustrating an example of area segmentation for document data.

FIG. 14A illustrates an example of area segmentation in the present exemplary embodiment.

For example, there is a case where the front end, rear end, left end, and right end of a document depend on a light source configuration of a reading device, and a shadow of the document is generated due to inaccurate reading. In this case, if a value other than document image data is used in calculation and generation of a histogram and edge information by the blank page determination processing unit 504, accurate analysis is obstructed. Therefore, it is necessary to perform control in such a way not to obtain the shadow part. The area control unit 601 identifies such a shadow part, and generates a signal indicating the shadow part as the ineffective area to prevent a histogram and edge information from being generated in subsequent processing, and a part except for the shadow part as the effective area.

Further, the area control unit 601 segments a main scanning effective area and a sub scanning effective area of the document into a plurality of areas. In other words, the area control unit 601 outputs an effective ineffective area signal 701 and an area signal 702 to subsequent processing units (a histogram generation unit 602 and an edge information generation unit 604), in addition to the pixel signal Dg.

Here, if a histogram is generated from the entire image data, it may be difficult to determine whether the document includes a small amount of text or impurities are contained in the document paper. To execute this determination appropriately, it is necessary to perform control to segment an image into a plurality of areas and to generate a histogram for each of the areas. A feature of a local print part, and a feature of overall distributed impurities contained in the sheet can be distinguished from each other, by segmenting the image data into the plurality of areas.

Further, with respect to the edge information, likewise, if the number of edges of the entire image data is used, it may be difficult to determine a distinction between recycled paper containing many impurities and a small amount of printing information. To make this determination appropriately, it is necessary to perform control to segment an image into a plurality of areas and to generate edge information for each of the areas. A local print part and a blank page document such as recycled paper where impurities are distributed in the entire sheet can be distinguished from each other, by generating the edge information for each of the areas and calculating variations in the number of edges between the areas.

Figure 14B:
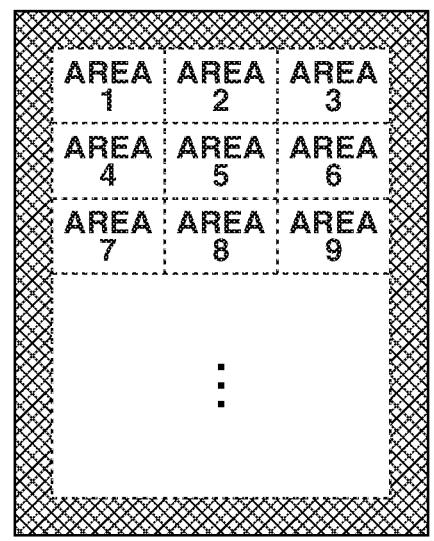

In addition, when performing the area segmentation in the area control unit 601, a size in the sub-scanning direction (the document conveying direction) of the document may not be established at a time when reading begins in the feeding-reading mode using the ADF. FIG. 14B illustrates an example of the area segmentation in this case. When the size in the sub-scanning direction is not established, it is difficult to perform uniform segmentation of an area with respect to the sub-scanning direction illustrated in FIG. 14A. In this case, as illustrated in FIG. 14B, control of the area segmentation in the sub-scanning direction should be performed by setting an area having a predetermined width in the sub-scanning direction, and arranging the area having the predetermined width repeatedly in the sub-scanning direction. The area in the sub-scanning direction can be thereby segmented.

Returning to FIG. 6, the histogram generation unit 602 generates the histogram of each area, from the pixel signal Dg, an effective/ineffective area signal 701, and an area signal 702.

The edge information generation unit 604 generates the edge information of each area, from the pixel signal Dg, the effective/ineffective area signal 701, and the area signal 702.

Figure 7A:
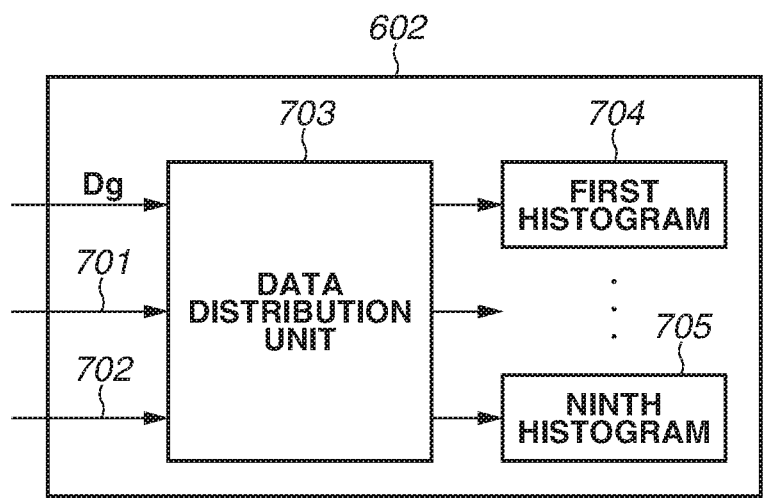
FIGS. 7A and 7B are block diagrams illustrating an example of a histogram generation unit, and an example of an edge information generation unit, respectively.
Figure 7B:
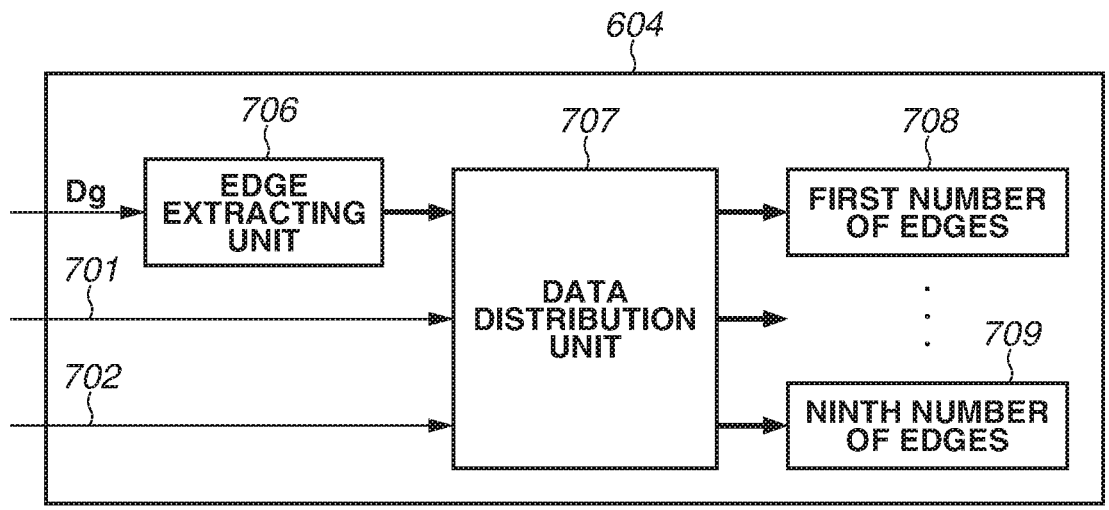

FIGS. 7A and 7B illustrate an inner configuration of the histogram generation unit 602 and an inner configuration of the edge information generation unit 604, respectively.

FIG. 7A illustrates the inner configuration of the histogram generation unit 602.

A data distribution unit 703 distributes the data according to the pixel signal Dg, the effective ineffective area signal 701, and the area signal 702 to generate histograms in a subsequent stage. Here, if the effective ineffective area signal 701 indicates the ineffective area, no signal is output to the subsequent stage. The data distribution unit 703 also has a function of outputting 5 bits after removal of lower 3 bits to the subsequent stage in a case where a histogram is generated with a 32-step gradation (5 bits) for 8-bit precision of the pixel signal Dg.

The data distribution unit 703 distributes the data from a first histogram 704 to a ninth histogram 705. The second to eighth histograms are not illustrated in FIG. 7A to simplify the description.

FIG. 7B illustrates the inner configuration of the edge information generation unit 604.

An edge extracting unit 706 extracts the edge from the pixel signal Dg. Here, for example, convolution is performed using a 7×7 matrix. If an output is equal to or greater than a threshold, an edge signal indicating an edge portion is output to a subsequent stage, whereas if the output is less than the threshold, an edge signal indicating a non-edge portion is output to the subsequent stage. Coefficients of the 7×7 matrix and the threshold to be used here are read from a register (not illustrated).

A data distribution unit 707 distributes the data according to the edge signal output from the edge extracting unit 706, the effective/ineffective area signal 701, and the area signal 702 to reflect the data in the number of edges in a subsequent stage. Here, if the effective/ineffective area signal 701 indicates the ineffective area, no data is output to the subsequent stage. The data distribution unit 707 distributes the data from a first number 708 of edges to a ninth number 709 of edges. The second number to the eighth number of edges are not illustrated in FIG. 7B to simplify the description.

A histogram analysis unit 603 determines whether the document is a blank page, from the first to ninth histograms generated in the histogram generation unit 602. The histogram analysis unit 603 will be described in detail below using FIG. 8.

An average value calculation unit 802 calculates first to ninth average values 808, from the first to ninth histograms 801 generated in the histogram generation unit 602, respectively.

A variance value calculation unit 803 calculates first to ninth variance values, from the first to ninth histograms 801 generated in the histogram generation unit 602 and the first to ninth average values 808 calculated in the average value calculation unit 802.

Upon receipt of the average values 808 and input brightness values output from the average value calculation unit 802, as well as the histograms 801, the variance value calculation unit 803 calculates a difference from the average value. Here, the variance value calculation unit 803 calculates a differential value, based on (average value−brightness value)×(average value−brightness value)×frequency. The variance value calculation unit 803 then performs accumulation addition of the differential values for all the brightness values, and further performs processing for dividing the cumulative addition value by all the frequencies, thereby calculating the variance value. For example, a high variance value is calculated when there is some print part, whereas a low variance value is calculated when there is only a background color.

An average value determination unit 804 compares the average value calculated by the average value calculation unit 802 with a threshold, thereby determining whether the segment area is not covered with a dark print part (e.g., a shade in a picture). Here, the average value determination unit 804 outputs a determination signal indicating a blank page when the average value is equal to or greater than the threshold, and outputs a determination signal indicating a content page (not a blank page) when the average value is less than the threshold. The average value determination unit 804 performs this determination for each of the first to ninth areas.

A variance value determination unit 805 compares the variance value calculated by the variance value calculation unit 803 with a threshold, thereby determining the degree of variations in the brightness values of the segment area. Here, when the variance value is equal to or greater than the threshold, the degree of variations in the brightness values is high, and the variance value determination unit 805 determines that a print part is present and outputs a determination signal indicating the content page. When the variance value is less than the threshold, the degree of variations in the brightness values is low, and the variance value determination unit 805 determines that only a background is present and then outputs a determination signal indicating the blank page. The variance value determination unit 805 performs the determination for each of the first to ninth areas.

A histogram determination unit 806 determines whether the document image is the blank page, from the determination signals of the average value determination unit 804, and the determination signals of the variance value determination unit 805. Here, when the determination signals of the average value determination unit 804 and the determination signals of the variance value determination unit 805 in the first to ninth areas all indicate the blank page candidate, the histogram determination unit 806 outputs a determination signal 807 indicating the blank page candidate. When the determination signals indicating the content page is present, even if such a signal is present for only one area, the histogram determination unit 806 outputs the determination signal 807 indicating the content page, not the blank page.

In the above case, the histogram determination unit 806 identifies the content when the determination signals indicating the content is present, even if such a signal is present concerning only one area. However, beyond that, for example, threshold processing may be performed for the number of areas in which the content is identified, and the determination signal indicating the content may be output when the presence of the content is identified in a predetermined number or more of areas.

An edge information analysis unit 605 determines whether the document is a blank page, from the information about the first number to the ninth number of edges generated in the edge information generation unit 604.

The edge information analysis unit 605 will be described in detail below using FIG. 9.

A maximum value calculation unit 901 determines a maximum number of edges, from the first number to the ninth number of edges generated in the edge information generation unit 604.

A minimum value calculation unit 902 determines a minimum number of edges, from the first number to the ninth number of edges generated in the edge information generation unit 604.

A higher limit determination unit 903 performs threshold processing on the maximum number of edges determined in the maximum value calculation unit 901, and outputs a determination signal indicating whether the document is the blank page. Here, a determination signal indicating the content candidate is output when the maximum number of edges is equal to or greater than a threshold, whereas a determination signal indicating the blank page candidate is output when the maximum number of edges is less than the threshold. For example, when an apparatus such as a digital multifunction peripheral is used, security dots may be printed to restrict copying of a print. The security dots may be printed on the entire image. In such a case, the same number of edges may be counted for all the areas when a comparison between the areas in terms of edge distribution is performed in a subsequent stage, so that the document may be determined to be the blank page. In other words, it is necessary to determine that the content is present when the number of edges exceeds a predetermined number.

A lower limit determination unit 904 performs threshold processing on the maximum number of edges determined in the maximum value calculation unit 901, and outputs a determination signal indicating whether the document is the blank page. Here, a determination signal indicating the content candidate is output when the maximum number of edges is equal to or greater than a threshold, whereas a determination signal indicating the blank page candidate is output when the maximum number of edges is less than the threshold.

For example, when high quality paper such as coated paper is used, most of edges may not be extracted. In other words, there may be a case where, if the number of edges is 0 in one area and the number of edges is 10 in another area, a result of 0/10=0 is obtained from a comparison between the areas in terms of relative value, i.e., a correlation value is a minimum. In this case, the document may be determined to have the content. Here, a low correlation value refers to a large difference between the areas in terms of the number of edges.

For example, in a case of ordinary white paper, when the minimum number of edges is 300 and the maximum number of edges is 320, a correlation value is 300/320=0.93, which means correlation is high. In other words, it should be determined that the document is the blank page when the number of edges in each area is less than a predetermined number.

By using the maximum number of edges calculated in the maximum value calculation unit 901 and the minimum number of edges calculated in the minimum value calculation unit 902, a division unit 905 performs division processing, thereby calculating the correlation value between the areas.

Here, the division unit 905 calculates the correlation value by dividing the minimum number of edges by the maximum number of edges.

A minimum value determination unit 906 outputs a determination signal indicating whether the document is the blank page, from the correlation value calculated by the division unit 905. Here, the minimum value determination unit 906 compares the correlation value calculated in the division unit 905, with a threshold. When the correlation value is equal to or greater than the threshold, the minimum value determination unit 906 determines that the document is the blank page. When the correlation value is less than the threshold, the minimum value determination unit 906 determines that the content is present. In other words, when the correlation value is high, the difference between the maximum number of edges and the minimum number of edges is small and thus, the minimum value determination unit 906 determines that the document is the blank page. When the correlation value is low, the difference between the maximum number of edges and the minimum number of edges is large and thus, the minimum value determination unit 906 determines that the content is present.

An edge determination unit 907 determines whether the document is the blank page, from the determination signal of the higher limit determination unit 903, the determination signal of the lower limit determination unit 904, and the determination signal of the minimum value determination unit 906.

Here, when the determination signal of the higher limit determination unit 903 indicates the content, the edge determination unit 907 outputs a determination signal indicating the content, without referring to the determination signal of each of the lower limit determination unit 904 and the minimum value determination unit 906.

Further, when the determination signal of the higher limit determination unit 903 indicates the blank page candidate and the determination signal of the lower limit determination unit 904 indicates the blank page, the edge determination unit 907 outputs a determination signal indicating the blank page, without referring to the determination signal of the minimum value determination unit 906. Furthermore, when the determination signal of the higher limit determination unit 903 indicates the blank page candidate and the determination signal of the lower limit determination unit 904 indicates the content candidate, the edge determination unit 907 outputs the determination signal of the minimum value determination unit 906.

A blank page determination unit 606 finally determines whether the image data as the determination target and the document read to obtain the image data, are the blank page, from the determination signal of the histogram analysis unit 603 and the edge information analysis unit 605.

In the present case, when the determination signal from the histogram analysis unit 603 indicates the blank page and the determination signal from the edge information analysis unit 605 also indicates the blank page, the blank page determination unit 606 computes a determination signal indicating that the read document image is the blank page. When the determination signal from either the histogram analysis unit 603 or the edge information analysis unit 605 indicates the content, the blank page determination unit 606 computes a determination signal indicating the content. Upon completion of this blank page determination processing, the blank page determination unit 606 notifies the CPU 301 of the completion.

<Color Determination Processing Unit>

Figure 10:
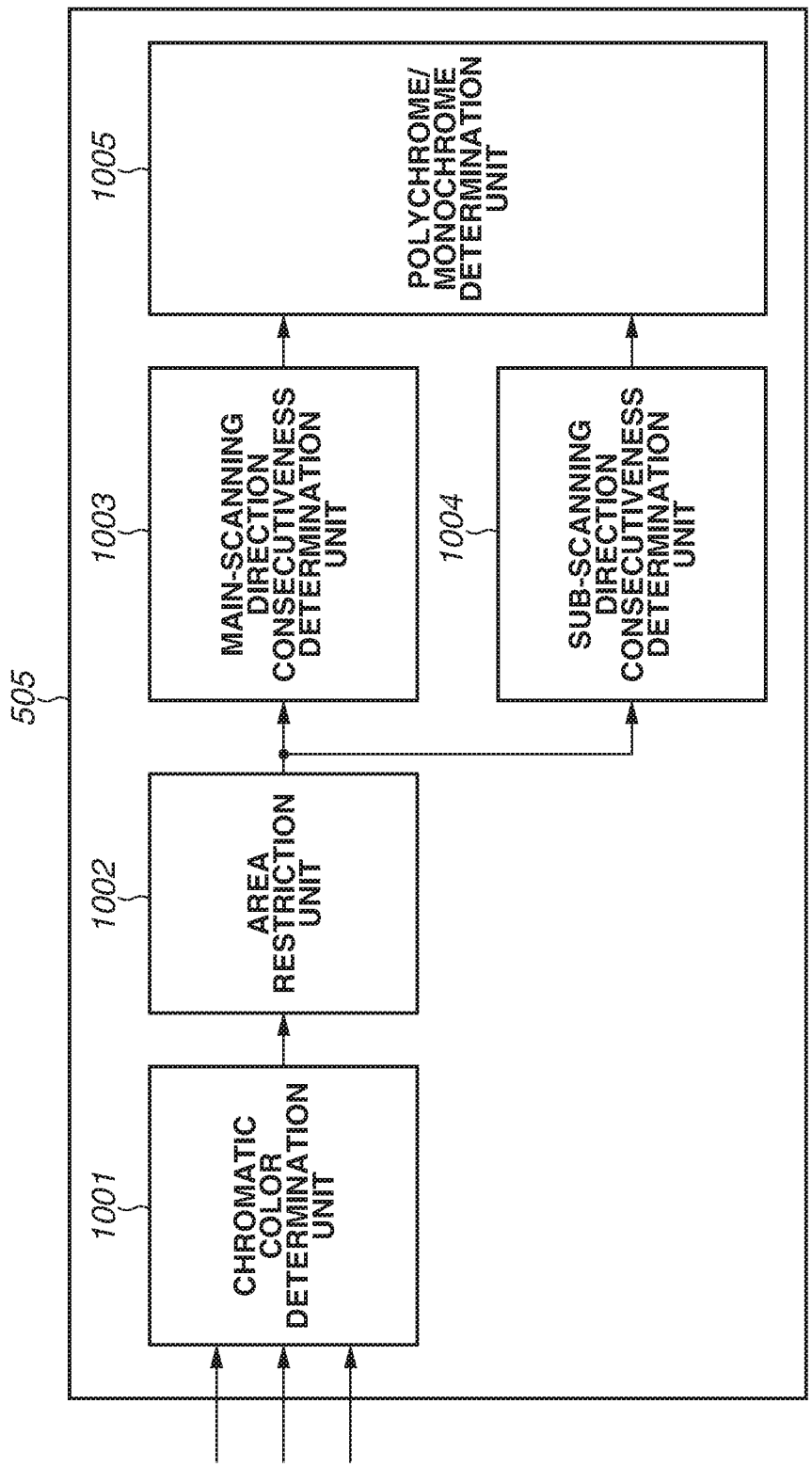
FIG. 10 is a block diagram illustrating an example of a color determination processing unit.

FIG. 10 is a diagram illustrating an inner configuration of the color determination processing unit 505 in the present exemplary embodiment. The color determination processing unit 505 is connected to a register (not illustrated), which holds control parameters and processing results. Writing to the register is performed by the CPU 301 and the color determination processing unit 505. The color determination processing unit 505 reads the control parameters set in the register to perform an operation.

From the input RGB image data, a chromatic color determination unit 1001 determines whether the pixel of this image data is a chromatic color pixel or an achromatic color pixel, and outputs a result of this saturation determination. As a method for calculating a saturation S, the following expression (1) can be used.

$$S=\text{MAX}(R,G,B)-\text{MIN}(R,G,B) \quad (1)$$

Alternatively, the RGB data may be converted into a lightness signal L indicating brightness and chrominance signals (Ca, Cb) indicating color impression by using the following expression (2), and the saturation S may also be calculated by using the following expression (3).

$$L=(R+2G+B)/4$$

$$Ca=(R-G)/2 \quad (2)$$

$$Cb=(R+G-2B)/4$$

$$S=\text{MAX}(Ca,Cb) \quad (3)$$

It is determined whether each pixel of the image data is a chromatic color pixel or an achromatic color pixel by performing the following threshold processing for the saturation S.

If (S<Th1) Then achromatic color pixel
else chromatic color pixel

An area restriction unit 1002 can divide the determination results of the chromatic color determination unit 1001 into a polychrome/monochrome determination effective area and a polychrome/monochrome determination ineffective area. The polychrome/monochrome determination ineffective area to be set may be a determination area similar to the ineffective area illustrated in FIGS. 14A and 14B set by the blank page determination processing unit 504. In the area restriction unit 1002, with respect to the determination results of the chromatic color determination unit 1001, all the pixels in the polychrome/monochrome determination ineffective area are forcibly replaced with a determination result indicating the achromatic color pixel. Therefore, polychrome/monochrome determination processing can be performed only concerning the pixels in the polychrome/monochrome determination effective area.

A main-scanning direction consecutiveness determination unit 1003 determines whether a predetermined number M of consecutive chromatic color pixels are present in the main-scanning direction, and whether a predetermined number Mg or more of clusters of the predetermined number M of consecutive chromatic color pixels are present. The main-scanning direction consecutiveness determination unit 1003 then outputs a result of this determination, as a main-scanning direction determination result.

A sub-scanning direction consecutiveness determination unit 1004 determines whether a predetermined number N of consecutive chromatic color pixels are present in the sub-scanning direction, and whether a predetermined number Ng or more of clusters of the predetermined number N of consecutive chromatic color pixels are present. The sub-scanning direction consecutiveness determination unit 1004 then outputs a result of this determination, as a sub-scanning direction determination result.

From the determination results of the main-scanning direction consecutiveness determination unit 1003 and the sub-scanning direction consecutiveness determination unit 1004, a polychrome/monochrome determination unit 1005 determines whether the image data is polychrome or monochrome, according to predetermined conditions. The determination result can be freely obtained. For example, if the determination result of either the main-scanning direction consecutiveness determination unit 1003 or the sub-scanning direction consecutiveness determination unit 1004 indicates one or more chromatic color lines, the image data is determined to be polychrome. Upon completion of the color determination processing, the polychrome/monochrome determination unit 1005 notifies the CPU 301 of the completion.

The consecutiveness of the chromatic color pixels in each of the main-scanning direction and the sub-scanning direction is thus observed to prevent such a problem that a false color, for example, is determined to be a chromatic color pixel. The false color occurs at an edge portion of monochrome content, due to a modulation transfer function (MTF) difference of a lens or a color shift in a reader.

<Blank Page Removal Setting>

Figure 13:
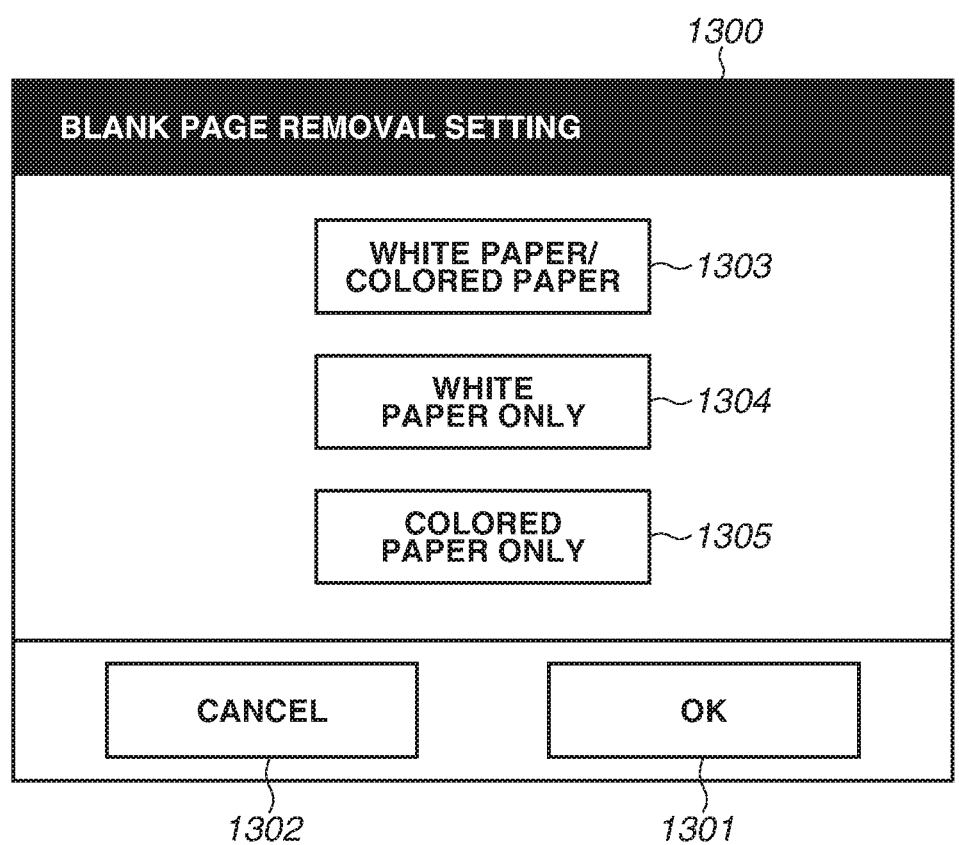
FIG. 13 is diagram illustrating an example of a blank page removal setting screen.

FIG. 13 illustrates an example of a blank page removal setting screen 1300 in the present exemplary embodiment. This setting screen is displayed on the liquid crystal control panel 401.

When an OK button 1301 is pressed, a setting value in the blank page removal setting screen 1300 is stored, and then this screen is closed.

When a cancel button 1302 is pressed, the setting value in the blank page removal setting screen 1300 becomes invalid, and then the screen is closed.

Setting buttons 1303, 1304, and 1305 are used to set image data to be removed, among image data obtained by reading documents determined to be the blank pages. This setting allows change of processing of the image data obtained by reading the documents determined to be the blank pages.

The setting button 1303 is used when it is desirable to remove image data obtained by reading a document whose paper background color is white (white paper) and image data obtained by reading a document of colored paper (paper with color), from among the documents determined to be blank pages.

When the setting button 1303 (for removal of white paper/colored paper) is pressed and then the OK button 1301 is pressed, this setting becomes valid.

The setting button 1304 is used when it is desirable to remove only image data obtained by reading a document whose paper background color is white (white paper), from among the documents determined to be blank pages.

When the setting button 1304 (for removal of only white paper) is pressed and then the OK button 1301 is pressed, the setting becomes valid.

The setting button 1305 is used when it is desirable to remove only image data obtained by reading a document of colored paper (paper with color), from among the documents determined to be blank pages.

When the setting button 1305 (for removal of only colored paper) is pressed and then the OK button 1301 is pressed, the setting becomes valid.

In this setting screen, the user can remove only a page according to an intended use, by selecting the image data desirable to be removed from among the image data obtained by reading documents determined to be blank pages.

The three types of setting are described above, but only two of these three types may be set (e.g., only the setting button 1303 and the setting button 1304 may be provided).

<Copy Operation Flowchart>

Figure 11:
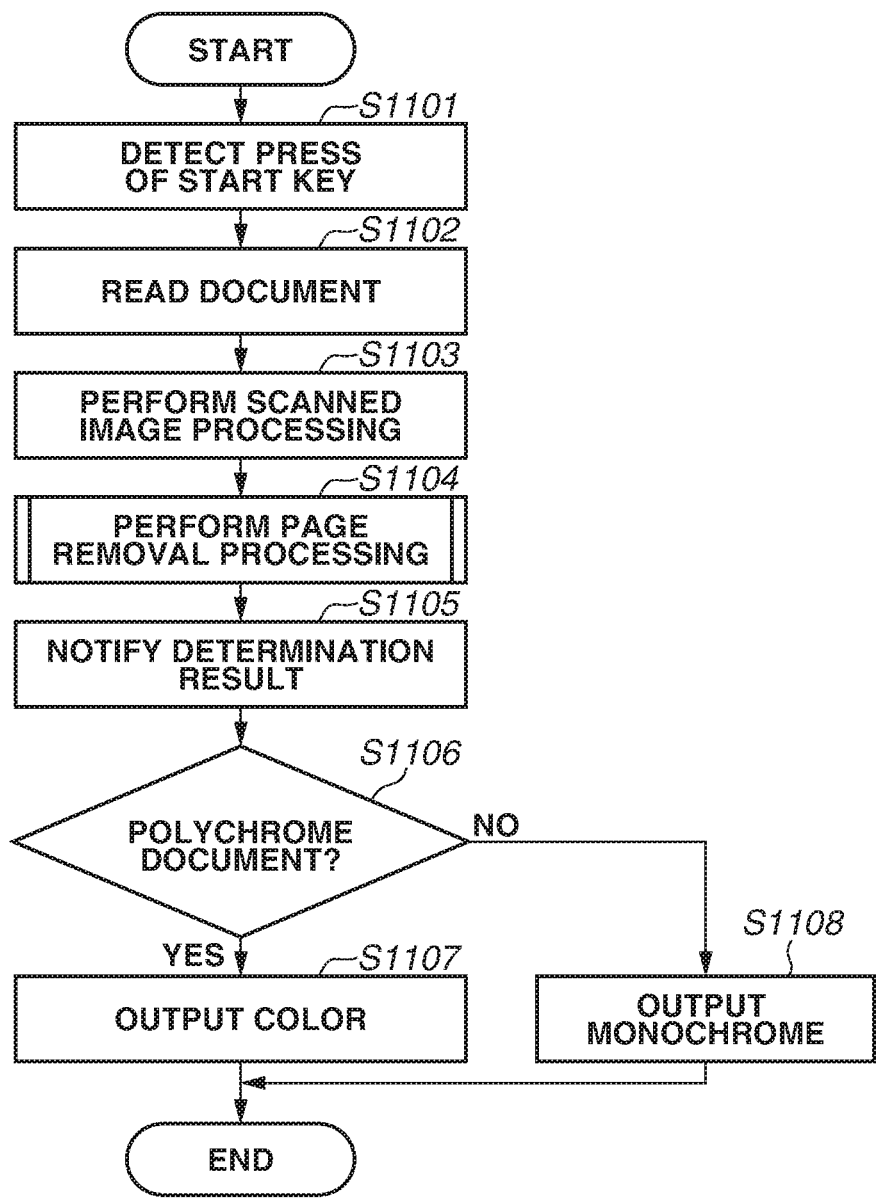
FIG. 11 is a flowchart illustrating a flow of copy operation.

FIG. 11 is a flowchart illustrating a flow of copy operation in the present exemplary embodiment. The CPU 301 executes the flowchart illustrated in FIG. 11, according to a program stored in the HDD 304.

In step S1101, the copy operation begins upon detection of a press of the start key 402 in the operation unit 120.

In step S1102, document reading is actually performed using the document feeder 111. Specifically, as described with reference to FIG. 2, the document reading operation is performed by feeding the documents one by one from the tray 141 of the document feeder 111.

In step S1103, while various kinds of image processing are performed in the scanner IF image processing unit 309 on the image data obtained from the read document, processing for storing the image data into the RAM 302 is executed. Here, the blank page determination processing is executed by the blank page determination processing unit 504. In addition, the processing for determining whether the read image data is polychrome or monochrome is executed by the color determination processing unit 505.

In step S1104, the page removal processing is executed based on the determination result of the blank page determination processing unit 504 and the color determination processing unit 505, as well as the setting value in the blank page removal setting screen 1300 illustrated in FIG. 13 described above. The page removal processing will be described in detail below.

In step S1105, the result of the page removal processing is notified. In step S1106, based on the polychrome/monochrome determination result of the color determination processing unit 505, it is determined whether the read document is polychrome or monochrome. When it is determined that the read document is polychrome (YES in step S1106), the processing proceeds to step S1107. When it is determined that the read document is monochrome (NO in step S1106), the processing proceeds to step S1108.

In step S1107, print processing for polychrome is performed using the printer IF image processing unit 308. Specifically, first, the RGB image data held in the RAM 302 is read out and then converted into cyan, magenta, yellow, and key or black (CMYK) data. The gamma correction processing is then performed on the image data according to tone characteristics of an engine. The image data is then transmitted to the printer 100 to output a polychrome print, which completes the processing.

In step S1108, print processing for monochrome is performed using the printer IF image processing unit 308. Specifically, first, the RGB image data held in the RAM 302 is read out and then converted into K (black) data. The gamma correction processing is then performed on the image data according to the tone characteristics of the engine. The image data is then transmitted to the printer 100 to output a monochrome print, which completes the processing.

In the present exemplary embodiment, the processing performed during the copy operation is described. However, the processing is not limited to this example, and may be performed, for example, during e-mail transmission output control.

<Flowchart of Page Removal Processing>

Figure 12:
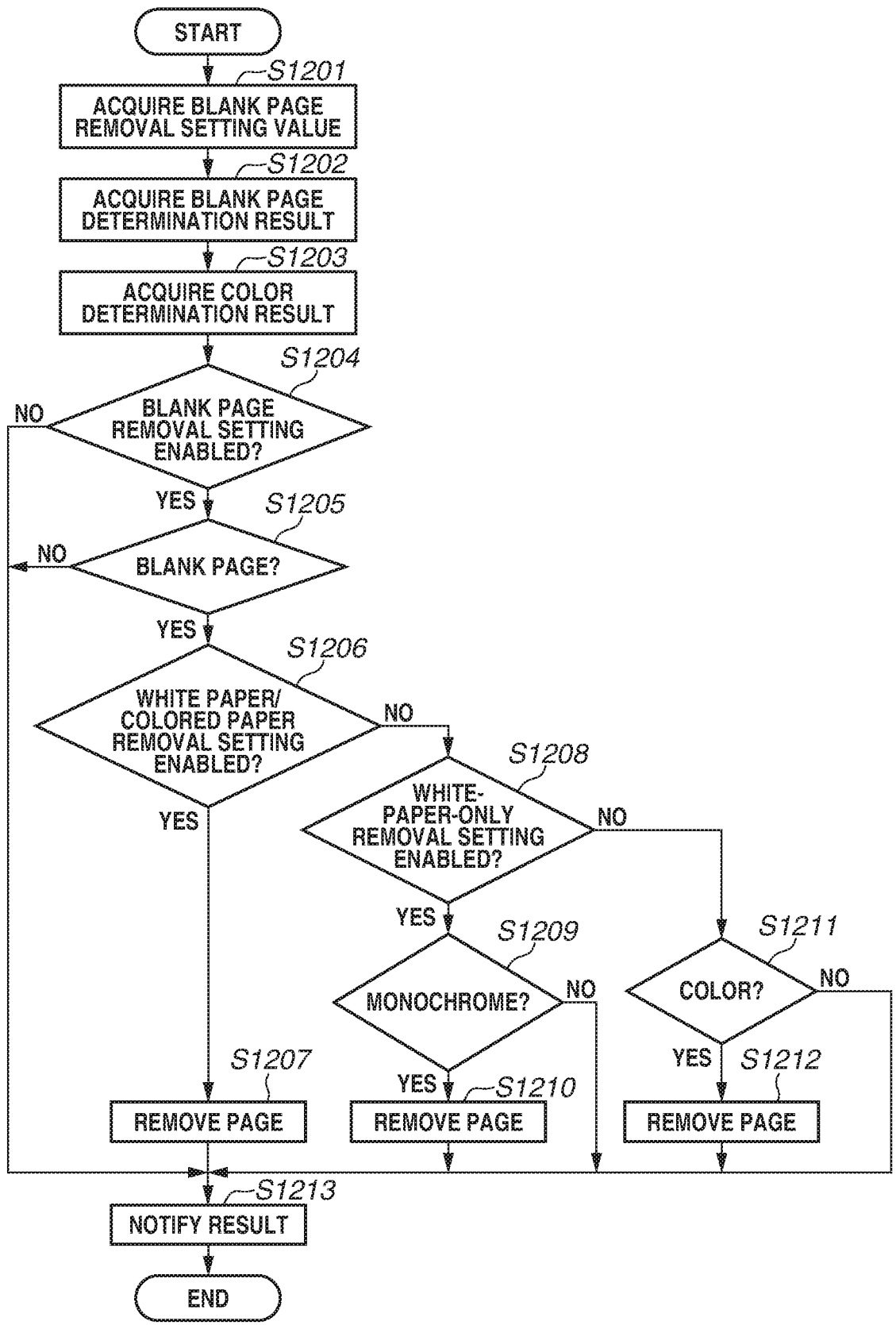
FIG. 12 is a flowchart illustrating a flow of blank page removal.

FIG. 12 is a flowchart illustrating a flow of the page removal in the present exemplary embodiment. The CPU 301 executes the flowchart illustrated in FIG. 12, according to a program stored in the HDD 304.

In step S1201, setting information, which is set via the blank page removal setting screen 1300 illustrated in FIG. 13, is acquired.

In step S1202, the determination result of the blank page determination processing unit 504, which is performed for the image data serving as the processing target, is acquired.

In step S1203, the polychrome/monochrome determination result, which is generated in the color determination processing unit 505 for the image data serving as the processing target, is acquired.

In step S1204, it is determined whether any one of the setting buttons 1303 to 1305, which are the blank page removal setting buttons, is set in the blank page removal setting screen 1300. When none of these buttons is set, i.e., the blank page removal setting is off (NO in step S1204), the processing proceeds to step S1213, without performing the page removal. When any one of these buttons is set (YES in step S1204), the processing proceeds to step S1205.

In step S1205, based on the blank page determination result acquired in step S1202, it is determined whether the document corresponding to the image data as the processing target is a blank page. When the blank page determination result indicates that the document is the blank page (YES in step S1205), the processing proceeds to step S1206. When the blank page determination result indicates that the content is present (NO in step S1205), the processing proceeds step S1213.

In step S1206, it is determined whether the setting acquired in step S1201 is made via the blank page removal setting screen 1300, to remove image data obtained by reading a document whose paper background color is white or reading a document of colored paper from among the documents determined to be blank pages.

When the setting is made to remove image data obtained by reading a document whose paper background color is white or reading a document of colored paper from among the documents determined to be blank pages (YES in step S1206), the processing proceeds to step S1207. When the setting for such removal is not made (NO in step S1206), the processing proceeds to step S1208.

In step S1207, the page removal is performed. Specifically, the image to be removed, which is stored in the image memory (the RAM 302), is detected and removed. Therefore, the image data obtained by reading the blank page of the colored paper and the image data obtained by reading the blank page of the white paper are removed. Alternatively, control may be performed not to execute the printing or the transmission.

In step S1208, it is determined whether the setting acquired in step S1201 is made via the blank page removal setting screen 1300 to remove only image data obtained by reading a document whose paper background color is white (white paper) from among the documents determined to be blank pages. When the setting is made to remove only image data obtained by reading a document whose paper background color is white (white paper) from among the documents determined to be blank pages (YES in step S1208), the processing proceeds to step S1209. When the setting for such removal is not made (NO in step S1208), i.e., in the present embodiment, when it is determined that the colored-paper removal setting is invalid, the processing proceeds to step S1211.

In step S1209, based on the polychrome/monochrome determination result acquired in step S1203, it is determined whether the image data as the determination target is data obtained by reading a document whose background color is white. When the polychrome/monochrome determination result indicates monochrome (YES in step S1209), i.e., when it is determined that the image data has been obtained by reading a document whose background color is white (blank page determination result=TRUE, and color determination result=monochrome), the processing proceeds to step S1210. On the other hand, when the polychrome/monochrome determination result indicates polychrome (NO in step S1209), the processing proceeds to step S1213, without removing the image data as the determination target.

In step S1210, the image to be removed, which is stored in the image memory (the RAM 302), is detected and removed. Therefore, the image data obtained by reading the blank page of the white paper is removed. Alternatively, control may be performed not to execute printing or transmission.

In step S1211, based on the polychrome/monochrome determination result acquired in step S1203, it is determined whether the image data as the determination target is data obtained by reading a document with colored background. When the polychrome/monochrome determination result indicates polychrome (YES in step S1211), i.e., when the it is determined that the image data has been obtained by reading a document with colored background (blank page determination result=TRUE, and color determination result=polychrome), the processing proceeds to step S1212. On the other hand, when the polychrome/monochrome determination result indicates monochrome (NO in step S1211), the processing proceeds to step S1213, without removing the image data as the determination target.

In step S1212, the image data to be removed which is stored in the image memory (the RAM 302), is detected and removed. Therefore, the image data obtained by reading the blank page of the colored paper is removed. Alternatively, control may be performed not to execute printing or transmission.

Figure 15A:
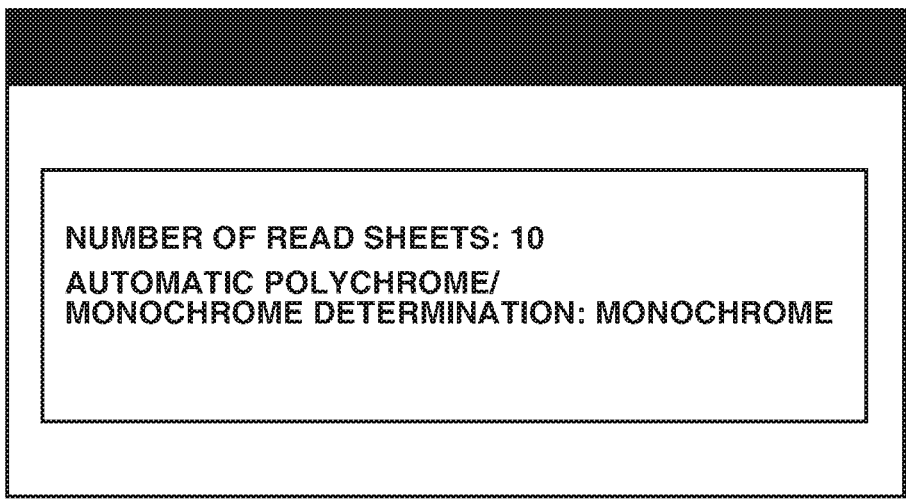
FIGS. 15A and 15B are diagrams each illustrating an example of a notification screen.
Figure 15B:
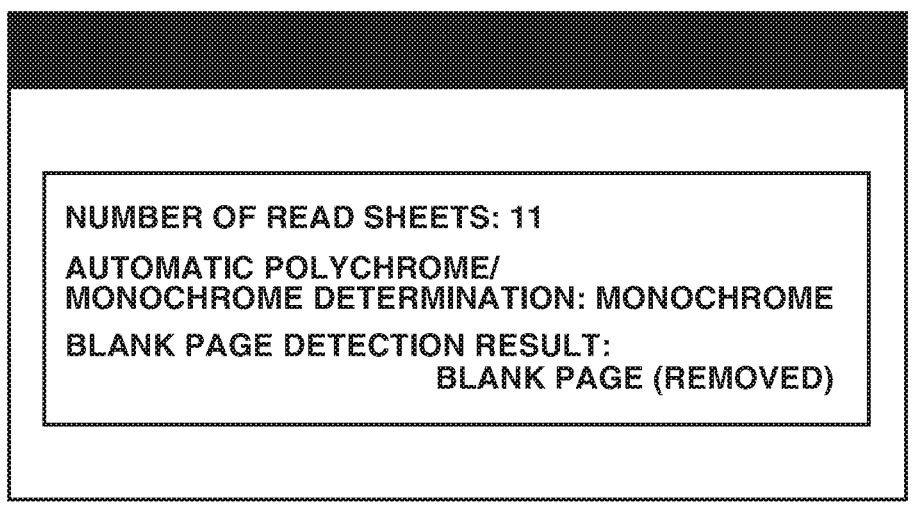

In step S1213, based on the removal result, the processing result is displayed on the liquid crystal control panel 401. FIGS. 15A and 15B illustrate an example of a result notification screen in the present exemplary embodiment. The result notification screen displays a determination result for each page, and the displayed content is changed each time a document is read.

FIG. 15A is an example of a screen displayed when the blank page removal setting is off. In this case, information which indicates whether the document read to acquire the image data as the processing target is polychrome or monochrome, is displayed based on the polychrome/monochrome determination result.

FIG. 15B is an example of a screen displayed when a blank page is detected, in a case where the white paper/colored paper removal setting is valid in the blank page removal setting. As illustrated in this example, when the page is removed, information indicating that the page is removed is displayed on the result notification screen.

Besides, the color determination result may be displayed.

Thus, by notifying the determination result and the process content for each page, whether the document has been removed can be easily confirmed during the document reading.

By performing the above-described processing, it is possible to detect and then remove the image data corresponding to the document determined to be a blank page, according to an intention of the user. In other words, whether to remove the image data corresponding to the page detected as a blank page can be changed based on the background color of the document of the page.

Next, a second exemplary embodiment will be described below. In the first exemplary embodiment, the method for determining the page to be removed and then removing the determined page is described. In this method, the page to be removed is determined based on the polychrome/monochrome determination result and the blank page determination result, as well as the target paper type set in the blank page removal setting screen (the background color of the document).

However, a color multi-function peripheral may have, for example, a plurality of color modes such as an automatic polychrome/monochrome mode, a full color mode, and a monochrome mode. Some of multi-function peripherals may acquire gray image data by using a monochrome sensor in order to operate at a high speed when the monochrome mode is specified. This is because, for example, high-speed monochrome reading can be implemented by performing division processing using an A/D converter provided corresponding to another color sensor. In this case, image data is read as a gray signal and thus, color information of a document is unclear. Therefore, it is difficult to detect correctly a removal target paper type set in a page removal setting screen.

Accordingly, in the present exemplary embodiment, a multi-function peripheral control operation is described which can correctly detect a removal target paper type set by a user even if a monochrome mode is specified as a color mode. The present exemplary embodiment will be described assuming that an automatic polychrome/monochrome mode, a full color mode, and the monochrome mode are each provided as the color mode.

The automatic polychrome/monochrome mode is a mode for automatically switching between polychrome output and monochrome output for each page, according to the polychrome/monochrome determination result of the color determination processing unit 505.

The full color mode is a mode for performing polychrome output irrespective of the polychrome/monochrome determination result of the color determination processing unit 505.

The monochrome mode is a mode for performing monochrome output irrespective of the polychrome/monochrome determination result of the color determination processing unit 505.

Figure 16:
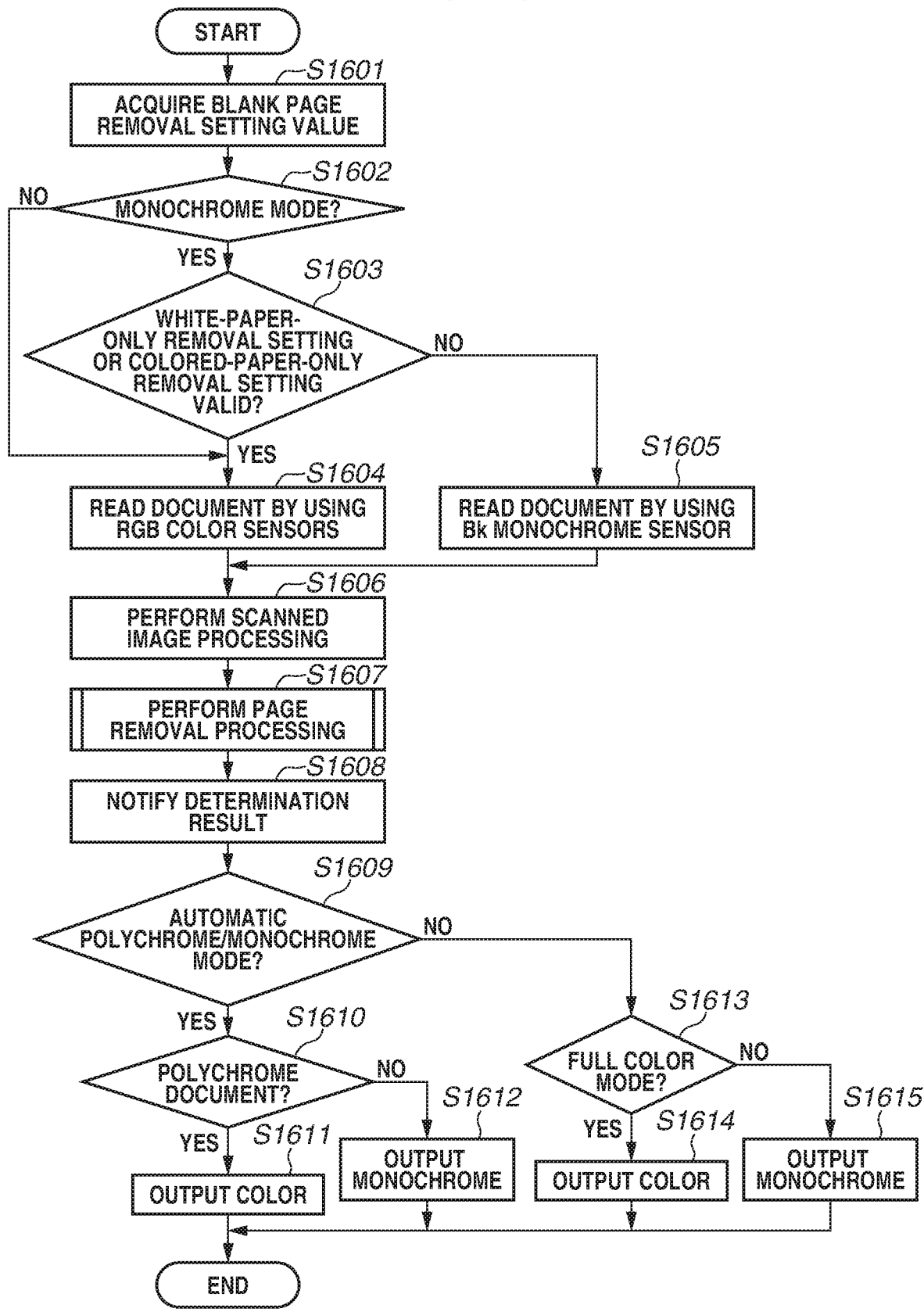
FIG. 16 is a flowchart illustrating a flow of copy operation in a second exemplary embodiment.

FIG. 16 is a flowchart illustrating an example of copy operation control according to the present exemplary embodiment. The CPU 301 executes the flowchart illustrated in FIG. 16, according to a program stored in the HDD 304.

In step S1601, the copy operation begins upon detection of a press of the start key 402 in the operation unit 120.

In step S1602, it is determined whether the monochrome mode is set in a color mode setting screen (not illustrated). When the monochrome mode is set (YES in step 1602), the processing proceeds to step S1603. When the mode other than the monochrome mode is set (NO in step 1602), the processing proceeds to step S1604.

In step S1603, it is determined whether either of the setting for removing only white paper or the setting for removing only colored paper is valid in the blank page removal setting screen 1300. When either of these two types of setting is valid (YES in step S1603), the processing proceeds to step S1604. When the setting for removing both white paper and colored paper is valid in the blank page removal setting screen 1300 or when no setting is valid, i.e., the blank page removal setting is off (NO in step S1603), the processing proceeds to step S1605.

In step S1604, document reading is actually performed using the document feeder 111. Specifically, as described with reference to FIG. 2, the document reading operation is performed by feeding the documents one by one from the tray 141 of the document feeder 111. The CCD sensor 217 includes four line sensors of R, G, B, and Bk. In step S1604, the document is read using the line sensors of R, G, and B. Information for appropriately removing a page intended by the user can be acquired by reading a document using the RGB color line sensors when the monochrome mode is specified.

In step S1605, the document is read using only the Bk line sensor. In the present exemplary embodiment, the document is read using the CCD sensor 217 including the four line sensors. However, monochrome image data may be acquired by reading image data with, for example, the G (green) line sensor instead of using the Bk line sensor. The polychrome/monochrome determination result is not required, depending on the page removal setting intended by the user, and high-speed document reading control can be performed by reading the image with the Bk line sensor as described above.

Step S1606 to step S1608 are similar step S1103 to step 1105 illustrated in FIG. 11, respectively, and therefore will not be described.

In step S1609, it is determined whether the automatic polychrome/monochrome mode is set in the color mode setting screen (not illustrated). When the automatic polychrome/monochrome mode is valid (YES in step S1609), the processing proceeds to step S1610. When the automatic polychrome/monochrome mode is invalid (NO in step S1609), the processing proceeds to step S1613.

Step S1610 to step S1612 are similar to step S1106 to step S1108 illustrated in FIG. 11 and therefore will not be described.

In step S1613, it is determined whether the full color mode is set in the color mode setting screen (not illustrated). When the full color mode is valid (YES in step S1613), the processing proceeds to step S1614. When the full color mode is invalid (NO in step S1613), i.e., when the monochrome mode is set in the present exemplary embodiment, the processing proceeds to step S1615.

Step S1614 and step S1615 are similar to step S1107 and step S1108 illustrated in FIG. 11 and therefore will not be described.

In the configuration described in the present exemplary embodiment, the gray image is read using the Bk monochrome sensor. However, exemplary embodiments are not limited to this example. Any configuration may be employed as long as the configuration allows acquisition of a gray image to enhance speed. For example, in an image reading apparatus that acquires RGB image data by sequentially turning on R, G, and B light sources, gray image data can be acquired by turning on all the R, G, and B light sources.

By performing the above-described processing, even if the image reading apparatus is of the type that reads an image by using the Bk line sensor in the monochrome mode, the reading sensor used in the reading can be changed according to the processing setting for a blank page to be removed.

Therefore, when it is necessary to distinguish between the image data obtained by reading the document whose background color is white and the image data obtained by reading the document of colored paper in the monochrome mode, the document is read using the color line sensors.

Accordingly, when it is necessary to determine whether the read document is white paper or colored paper, of the documents determined to be blank pages, reading can be performed using the color sensors even in the monochrome mode.

Therefore, the image data corresponding to the document determined to be a blank page can be detected and then removed, as intended by the user. In other words, whether to remove the image data corresponding to the detected blank page can be switched based on the background color of the page in the document.

(Other Embodiments)

An exemplary embodiment of the present invention is also implemented by executing processing as follows. First, software (a program) for implementing the functions of each of the above-described exemplary embodiments is supplied to a system or apparatus via a network or various storage media. A computer (or a CPU or micro processing unit (MPU)) of the system or apparatus then reads out a program code, and executes the program code. In this case, the program and the storage medium storing the program constitute the exemplary embodiment of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
    a reader that reads documents comprised of a plurality of pages and generates a plurality of pieces of page data which respectively corresponds to the plurality of pages;
    a printer;
    a user interface that receives a first setting or a second setting; and
    a controller that determines whether the plurality of pieces of page data, which respectively corresponds to the plurality of pages, corresponds to a white blank page, and determines whether the plurality of pieces of page data, which respectively corresponds to the plurality of pages, corresponds to a color blank page,
    wherein, in a case where the user interface receives the first setting, the printer executes a printing process based on the page data which corresponds to the white blank page, the printer does not execute a printing process based on the page data which corresponds to the color blank page, and the printer executes a printing process based on the page data which corresponds to a page which is not the white blank page and the color blank page, and
    wherein, in a case where the user interface receives the second setting, the printer executes the printing process based on the page data which corresponds to the white blank page, the printer executes the printing process based on the page data which corresponds to the color blank page, and the printer executes the printing process based on the page data which corresponds to the page which is not the white blank page or the color blank page.

2. The image processing apparatus according to claim 1, wherein the white blank page and the color blank page do not contain contents.

3. The image processing apparatus according to claim 1, wherein the controller determines, based on luminance information of the page data, whether the plurality of pieces of page data, which respectively corresponds to the plurality of pages, corresponds to a blank page, and
    wherein the controller determines, based on saturation information of the page data, whether the plurality of pieces of page data, which respectively corresponds to the plurality of pages, corresponds to a color page.

4. The image processing apparatus according to claim 3, wherein the luminance information of the page data corresponds to edge information of the plurality of pieces of page data, which respectively corresponds to the plurality of pages.

5. The image processing apparatus according to claim 3, wherein the luminance information of the page data corresponds to histogram information of the plurality of pieces of page data which respectively corresponds to the plurality of pages.

6. The image processing apparatus according to claim 1, wherein the user interface receives a third setting or a forth setting, wherein, in a case where the user interface receives the third setting, the printer does not execute the printing process based on the page data which corresponds to the white blank page, the printer executes the printing process based on the page data which corresponds to the color blank page, and the printer executes the printing process based on the page data which corresponds to the page which is not the white blank page or the color blank page, and wherein, in a case where the user interface receives the forth setting, the printer does not execute the printing process based on the page data which corresponds to the white blank page, the printer does not execute the printing process based on the page data which corresponds to the color blank page, and the printer executes the printing process based on the page data which corresponds to the page which is not the white blank page or the color blank page.

7. The image processing apparatus according to claim 3, wherein the controller determines, based on a variance value of the luminance information of the page data, whether the plurality of pieces of page data, which respectively corresponds to each of the plurality of pages, corresponds to a blank page.

8. An image processing method comprising:

reading documents comprised of a plurality of pages;

generating a plurality of pieces of page data which respectively corresponds to the plurality of pages;

receiving a first setting or a second setting; and determining whether the plurality of pieces of page data, which respectively corresponds to the plurality of pages, corresponds to a white blank page, and determining whether the plurality of pieces of page data, which respectively corresponds to the plurality of pages, corresponds to a color blank page, wherein, in a case where the first setting is received, a printing process based on the page data which corresponds to the white blank page is executed, a printing process based on the page data which corresponds to the color blank page is not executed, and a printing process based on the page data which corresponds to a page which is not the white blank page or the color blank page is executed, and wherein, in a case where the second setting is received, the printing process based on the page data which corresponds to the white blank page is executed, the printing process based on the page data which corresponds to the color blank page is executed, and the printing process based on the page data which corresponds to the page which is not the white blank page or the color blank page is executed.

9. A non-transitory computer-readable storage medium storing a program for causing a computer to execute an image processing method comprising;

reading documents comprised of a plurality of pages;

generating a plurality of pieces of page data which respectively corresponds to the plurality of pages;

receiving a first setting or a second setting; and determining whether the plurality of pieces of page data, which respectively corresponds to the plurality of pages, corresponds to a white blank page, and determining whether the plurality of pieces of page data, which respectively corresponds to the plurality of pages, corresponds to a color blank page, wherein, in a case where the first setting is received, a printing process based on the page data which corresponds to the white blank page is executed, a printing process based on the page data which corresponds to the color blank page is not executed, and a printing process based on the page data which corresponds to a page which is not the white blank page or the color blank page is executed, and wherein, in a case where the second setting is received, the printing process based on the page data which corresponds to the white blank page is executed, the printing process based on the page data which corresponds to the color blank page is executed, and the printing process based on the page data which corresponds to the page which is not the white blank page or the color blank page is executed.

* * * * *